Patented Sept. 17, 1935

2,014,810

UNITED STATES PATENT OFFICE 2,014,810

ANTHRAQUINONE DERIVATIVES

Frank Lodge and Colin Henry Lumsden, Blackley, Manchester, England, assignors to Imperial Chemical Industries Limited, a corporation of Great Britain No Drawing. Application November 22, 1934, Serial No. 754,371. In Great Britain November 28, 1933

12 Claims. (Cl. 260—59)

This invention relates to new acid anthraquinone dyes and new intermediates therefor.

An object of the invention is the manufacture of new derivatives of anthraquinone containing a long-chain (i. e. $C_8$ to $C_{20}$) alkoxy-group as substituent. A further object is the manufacture of new acid dyes by sulphonating the new anthraquinone derivatives. Other objects will appear from the following description.

We have found that the sulphonic group in a 1-amino-4-arylaminoanthraquinone-2-sulphonic acid body (by which term we mean the free acid or its salts) may be replaced by a long-chain alkoxy-group by heating it with an alkali metal derivative of a monohydric aliphatic alcohol having at least 8 and not more than 20 carbon atoms. The alkali metal derivative of the alcohol may be previously prepared by the action of the alkali metal or its hydroxide upon the alcohol; or it may be prepared in situ by adding to the 1-amino-4-arylaminoanthraquinone-2-sulphonic acid body the appropriate alcohol and caustic alkali. Caustic soda or caustic potash are convenient caustic alkalies for this purpose. For the separate preparation of the alkali metal derivative of the alcohol, sodium or potassium or their hydroxides may conveniently be used. Other alkali metals or their hydroxides are also effective.

The interaction of the 1-amino-4-arylaminoanthraquinone-2-sulphonic acid body with the alkali metal derivative of the alcohol may be effected in the presence or absence of a diluent, which may conveniently be pyridine, or an excess of the alcohol, or other suitable organic solvent.

The new anthraquinone derivatives so obtained may be sulphonated by treatment with a sulphonating agent, such as 100% sulphuric acid or weak fuming sulphuric acid.

The invention is illustrated but not limited by the following examples, in which the parts are by weight.

Example 1

100 parts of sodium-amino-4-anilinoanthraquinone-2-sulphonate, 300 parts of cetyl alcohol and 50 parts of caustic soda are stirred and heated at 90° C., for 1 hour. The reaction mixture is then stirred hot into a mixture of 2000 parts of methylated spirit and 500 parts of water. After cooling to 35° C., the product which separates is filtered off, washed with cold methylated spirit and purified by recrystallization from acetone.

The new intermediate 1-amino-4-aniline-2-cetoxy-anthraquinone, which separates from acetone solution on cooling is a violet crystalline substance giving a bluish-red solution in concentrated sulphuric acid and melting at 98° C.

100 parts of the new intermediate are dissolved at 15-20° C., in 1000 parts of 100% sulphuric acid. 250 parts of "oleum" (of 25% $SO_3$) are added during ¼ hour at 15-20° C. The mixture is heated at 25° C. for ¼ hour. It is then poured into 3500 parts of ice and water, and the precipitate is filtered off. The paste is stirred into 7000 parts of water, enough caustic soda to neutralize is added at 80° C., and the dyestuff is precipitated by adding 350 parts of common salt. After cooling it is filtered off, washed with 5% brine and dried. The so-obtained new dyestuff is a violet powder, which dyes wool from a weakly acid bath in violet shades of outstanding fastness to severe washing, milling and light.

Example 2

100 parts of sodium 1-amino-4-anilinoanthraquinone-2-sulphonate, 600 parts of dodecyl alcohol and 75 parts of caustic soda flakes are heated together at 115-120° C., for 1 hour. The reaction mixture is diluted with 3000 parts of alcohol and filtered cold. The crystalline product is washed with alcohol and water, then dried at 50° C. It dissolves in concentrated sulphuric acid with a bluish-red colour. After crystallizing from acetone the product melts at 104° C. It is sulphonated as described in Example 1. The so-obtained new dyestuff is a violet powder which dissolves in hot water to a violet, soapy solution. It dyes wool from a weakly acid bath in bright violet shades of outstanding fastness to severe washing and milling.

Example 3

100 parts of sodium 1-amino-4-anilinoanthraquinone-2-sulphonate, 500 parts of n-octyl alcohol and 240 parts of caustic soda liquor are heated at 115-120° C., for 20 hours. The product is filtered cold and washed with alcohol and cold water.

The bronzy crystalline product dissolves in concentrated sulphuric acid to a bluish-red solution. It also dissolves in benzene, acetone, and turpentine yielding violet solutions. It is sulphonated as described in Example 1. The so-obtained new dyestuff dyes wool from a weakly acid bath in bright violet shades of very good fastness to washing, milling and light.

Example 4

100 parts of dodecyl alcohol and 20 parts of caustic soda are stirred at 105° C., for 1 hour. After diluting with 250 parts of pyridine, 100 parts of 1 - amino-4-p-toluidino-anthraquinone-2-sulphonic acid are added and the mixture stirred at 115° C., until the sulphonic acid cannot be detected. The pyridine is then removed by steaming. The so-obtained product is violet and dissolves in sulphuric acid with a bluish-red colour.

It is sulphonated as described in Example 1, when it gives a new dyestuff which dyes wool in bright violet shades of outstanding fastness to washing and milling.

Example 5

1-amino-4-p-methoxyanilinoanthraquinone-2-sulphonic acid is substituted for the anthraquinone derivative used in Example 4. The resulting new dyestuff dyes wool in violet shades which are of good fastness to washing, milling and light.

Although in the foregoing examples the starting material used is a 1-amino-4-anilino- or 1-amino-4-p-toluidino- or 1-amino-4-p-methoxyanilinoanthraquinone-2-sulphonic acid bodies it is to be understood that other 1-amino-4-arylaminoanthraquinone-2-sulphonic acid bodies may also be employed. The following compounds and their salts have for example been found to give valuable results:

1 - amino - 4 - o-toluidinoanthraquinone-2-sulphonic acid, 1-amino-4-m-toluidinoanthraquinone-2-sulphonic acid, 1-amino-4-p-aminophenylaminoanthraquinone-2-sulphonic acid, 1-amino-4 - p - acetylaminophenylaminoanthraquinone-2-sulphonic acid, 1-amino-4-p-ethoxyphenylaminoanthraquinone-2-sulphonic acid, 1-amino-4-p-xylylaminoanthraquinone-2-sulphonic acid, 1-amino - 4 - m-xylylaminoanthraquinone - 2 - sulphonic acid.

As many apparently widely different embodiments of this invention may be made without departing from the spirit and scope thereof, it is to be understood that we do not limit ourselves to the specific embodiments thereof except as defined in the appended claims.

We claim:—

1. The step in the manufacture of new anthraquinone acid dyes which comprises the interaction of a 1-amino-4-arylaminoanthraquinone-2-sulphonic acid body with an alkali metal derivative of a monohydric aliphatic alcohol having at least 8 and not more than 20 carbon atoms, whereby the sulphonic group is replaced by a long-chain alkoxyl group.

2. Process as claimed in claim 1 in which the monohydric aliphatic alcohol used is cetyl alcohol.

3. Process as claimed in claim 1 in which the monohydric aliphatic alcohol used is dodecyl alcohol.

4. Process as claimed in claim 1 in which the monohydric aliphatic alcohol used is n-octyl alcohol.

5. Process for the manufacture of new anthraquinone acid dyes which comprises the interaction of a 1-amino-4-arylaminoanthraquinone-2-sulphonic acid body with an alkali metal derivative of a monohydric aliphatic alcohol having at least 8 and not more than 20 carbon atoms, whereby the sulphonic group is replaced by a long-chain alkoxyl group, followed by sulphonation of the product.

6. Process as claimed in claim 5 in which the monohydric aliphatic alcohol used is cetyl alcohol.

7. Process as claimed in claim 5 in which the monohydric aliphatic alcohol used is dodecyl alcohol.

8. Process as claimed in claim 5 in which the monohydric aliphatic alcohol used is n-octyl alcohol.

9. As a new composition of matter a compound having the formula

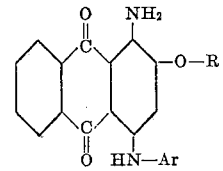

where R stands for an alkyl group having at least 8 and not more than 20 carbon atoms, and Ar stands for a non-sulphonated aryl group, the said compound being insoluble in water but giving on sulphonation a violet acid dye.

10. As a new composition of matter a compound having the formula

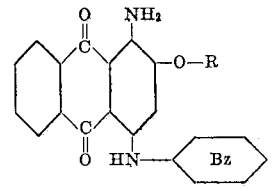

where R stands for an alkyl group having at least 8 and not more than 20 carbon atoms, and the ring Bz stands for a sulphonated aryl group of the benzene series, the said compound being soluble in water and giving violet shades on wool from an acid bath.

11. The new acid dye having the formula

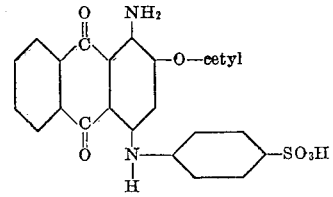

12. As a new composition of matter a compound having the formula

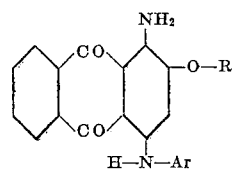

where R stands for an alkyl group having at least 8 and not more than 20 carbon atoms, and Ar stands for an aryl group which may contain a sulphonic acid radical.

FRANK LODGE.
COLIN HENRY LUMSDEN.